(12) United States Patent
Jeffries et al.

(10) Patent No.: US 11,196,767 B2
(45) Date of Patent: Dec. 7, 2021

(54) FRONT-END PROTOCOL FOR SERVER PROTECTION

(71) Applicant: International Business Machines Corporation, Armonk, NY (US)

(72) Inventors: Clark Debs Jeffries, Durham, NC (US); Mohammad Peyravian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 16/429,034

(22) Filed: Jun. 2, 2019

(65) Prior Publication Data

US 2019/0342327 A1 Nov. 7, 2019

Related U.S. Application Data

(63) Continuation of application No. 16/182,257, filed on Nov. 6, 2018, now Pat. No. 10,333,970, which is a continuation of application No. 13/495,210, filed on Jun. 13, 2012, now Pat. No. 10,129,292, which is a continuation of application No. 10/937,695, filed on Sep. 9, 2004, now Pat. No. 8,250,650.

(51) Int. Cl.
*H04L 29/06* (2006.01)

(52) U.S. Cl.
CPC ................. *H04L 63/1458* (2013.01)

(58) Field of Classification Search
None
See application file for complete search history.

(56) References Cited

U.S. PATENT DOCUMENTS

| 7,143,163 | B1 | 11/2006 | Bleichenbacher et al. |
| 7,197,639 | B1 | 3/2007 | Juels et al. |
| 7,290,281 | B1 | 10/2007 | McGrew |
| 7,694,335 | B1 | 4/2010 | Turner et al. |
| 2002/0087860 | A1 | 7/2002 | William Kravitz |
| 2003/0023743 | A1 | 1/2003 | Raphel et al. |

(Continued)

OTHER PUBLICATIONS

Dean, Drew & Stubblefield, Adam., "Using Client Puzzles to Protect TLS", Proceedings of the 10th USENIX Security Symposium; USENIX Association, p. 1-9. (Year: 2001).*

(Continued)

*Primary Examiner* — Jeffery L Williams
(74) *Attorney, Agent, or Firm* — James L. Baudino; Brian M. Restauro

(57) ABSTRACT

A method and technique for protecting against denial of service attacks includes maintaining a session count indicating a quantity of active client sessions a server is maintaining and a session threshold specifying a maximum quantity of concurrent client sessions the server can maintain. Responsive to receiving a request from a client, a request count maintained by the server is verified to be less than the session threshold and, if so, a challenge message is sent to the client and the request count is incremented. Responsive to receiving a response message to the challenge message from the client, the response message is verified, a session with the client is established, and the session count is incremented. Responsive to terminating the session with the client, the session count and the request count are decremented.

9 Claims, 3 Drawing Sheets

(56) References Cited

U.S. PATENT DOCUMENTS

| | | |
|---|---|---|
| 2004/0093371 A1 | 5/2004 | Burrows et al. |
| 2004/0139152 A1 | 7/2004 | Kaler et al. |
| 2004/0143670 A1 | 7/2004 | Roychowdhury et al. |
| 2005/0216954 A1 | 9/2005 | Ramaiah et al. |
| 2005/0249214 A1 | 11/2005 | Peng |
| 2009/0034551 A1 | 2/2009 | Elzur |

OTHER PUBLICATIONS

Feng, Wu-chang. "The case for TCP/IP puzzles." Comput. Commun. Rev. 33 (2003): 322-327. (Year: 2003).*

Xiaofeng Wang; Reiter, M.K., "Defending against denial-of-service attacks with puzzle auctions," Security and Privacy, 2003. Proceedings. 2003 Symposium on , vol. no., pp. 78-92, May 11-14, 2003 URL: http://ieeexplore.ieee.org/stamp/stamp.jsp?arnumber=1199329&isnumber=27002.

Aura, T., Nikander, P., and Leiwo, J. 2001. DOS-Resistant Authentication with Client Puzzles. In Revised Papers From the 8th international Workshop on Security Protocols (Apr. 3-5, 2000). B. Christianson, B. Crispo, and M. Roe, Eds. Lecture Notes In Computer Science, vol. 2133. Springer-Verlag, London, 170-177.

Back, A., "Hashcash: A Denial of Service Counter-Measure", 2002, http://citeseer.nj.nec.com/back02hashcash.html, Accessed Oct. 20, 2008.

Price, G., "A General Attack Model on Hash-Based Client Puzzles", 2003, Cryptography and Coding 2003, Springe-Verlag Berlin Heidelberg, p. 319-331.

Ari Juels and John Brainard. Client puzzles: A cryptographic countermeasure against connection depletion attacks. In Proc. 1999 Network and Distributed Systems Security Symposium (NDSS), pp. 151-165, San Diego, CA, Feb. 1999. Internet Society.

Abadi et al., "Moderately hard, memory-bound functions", 2003, In Proceedings of the 10th Annual Network and Distributed System Security Symposium, pp. 1-15.

Forouzan, Behrouz, Data Communications and Networking, 3rd ed., Jul. 14, 2003, McGraw-Hill, p. 267-291, 593-626.

* cited by examiner

| INDEX | 0 | 1 | ... | K-1 |
|---|---|---|---|---|
| PROBLEM | $(4359)^{53565} \mod 96377$ | $(7048)^{45857} \mod 78641$ | ... | $(3365)^{72874} \mod 56435$ |
| SOLUTION | 35105 | 47875 | ... | 45403 |
*FIG. 2*
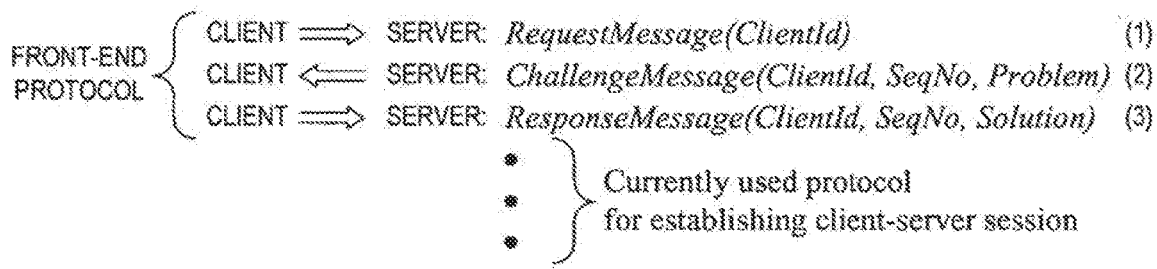
*FIG. 3*
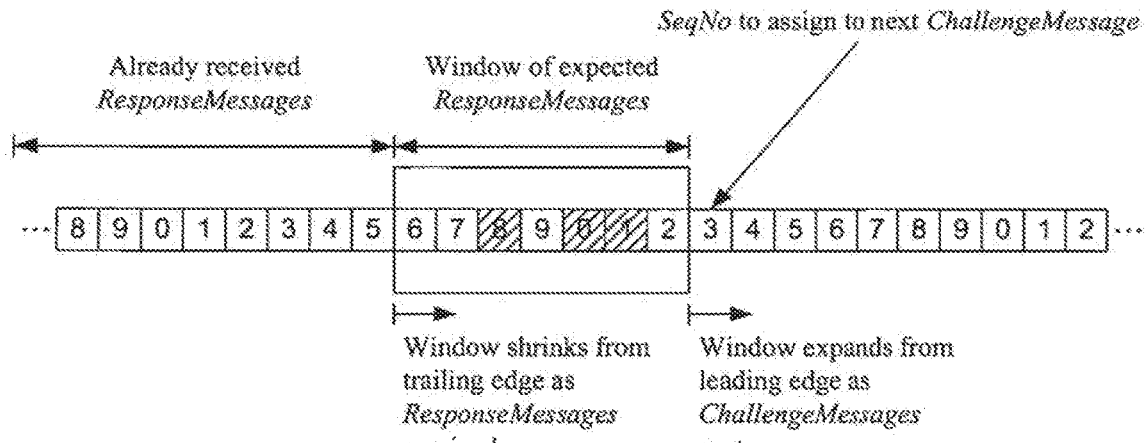
*FIG. 4*

FRONT-END PROTOCOL FOR SERVER PROTECTION

TECHNICAL FIELD

The present invention relates generally to computer security and, more particularly, to denial of service attacks.

BACKGROUND

In a Denial of Service (DOS) attack, a human adversary employs one or more client computers connected to the Internet, and compromises them by installing a DOS software on them. The human adversary then commands the compromised computers, using the installed DOS software, to send large volume of traffic having bogus requests to an Internet-connected server requesting services from it. It is possible that the server could not be able to differentiate between a legitimate request and a bogus request, since a bogus request can have the correct format as a legitimate request. Thus, the victim server gets overwhelmed by the large amount of requests and cannot even provide services to legitimate requests. DOS attacks are primarily launched against high-profile web sites/servers such as Yahoo®, E-Trade®, Amazon®, CNN®, and so on.

Therefore, there is a need for a countermeasure solution for protecting servers against DOS attacks that enables victim servers to sustain service availability during such attacks in such a manner that addresses at least some of the problems associated with conventional countermeasures.

SUMMARY OF THE INVENTION

The present invention provides for protecting against denial of service attacks. A server maintains a session count indicating a quantity of active client sessions the server is maintaining and a session threshold specifying a maximum quantity of concurrent client sessions the server can maintain. Responsive to receiving a request from a client, a request count maintained by the server is verified to be less than the session threshold and, if so, a challenge message is sent to the client and the request count is incremented. Responsive to receiving a response message to the challenge message from the client, the response message is verified, a session with the client is established, and the session count is incremented. Responsive to terminating the session with the client, the session count and the request count are decremented.

BRIEF DESCRIPTION OF THE DRAWINGS

For a more complete understanding of the present application, the objects and advantages thereof, reference is now made to the following Detailed Descriptions taken in conjunction with the accompanying drawings, in which:

FIG. 2 illustrates an example of a problem-solution table employed in FIG. 1;

FIG. 3 illustrates front-end protocol exchanges;

FIG. 4 illustrates a window maintained by the server of FIG. 1; and

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an NPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the NPU is sharing the computational element with other NPUs, unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
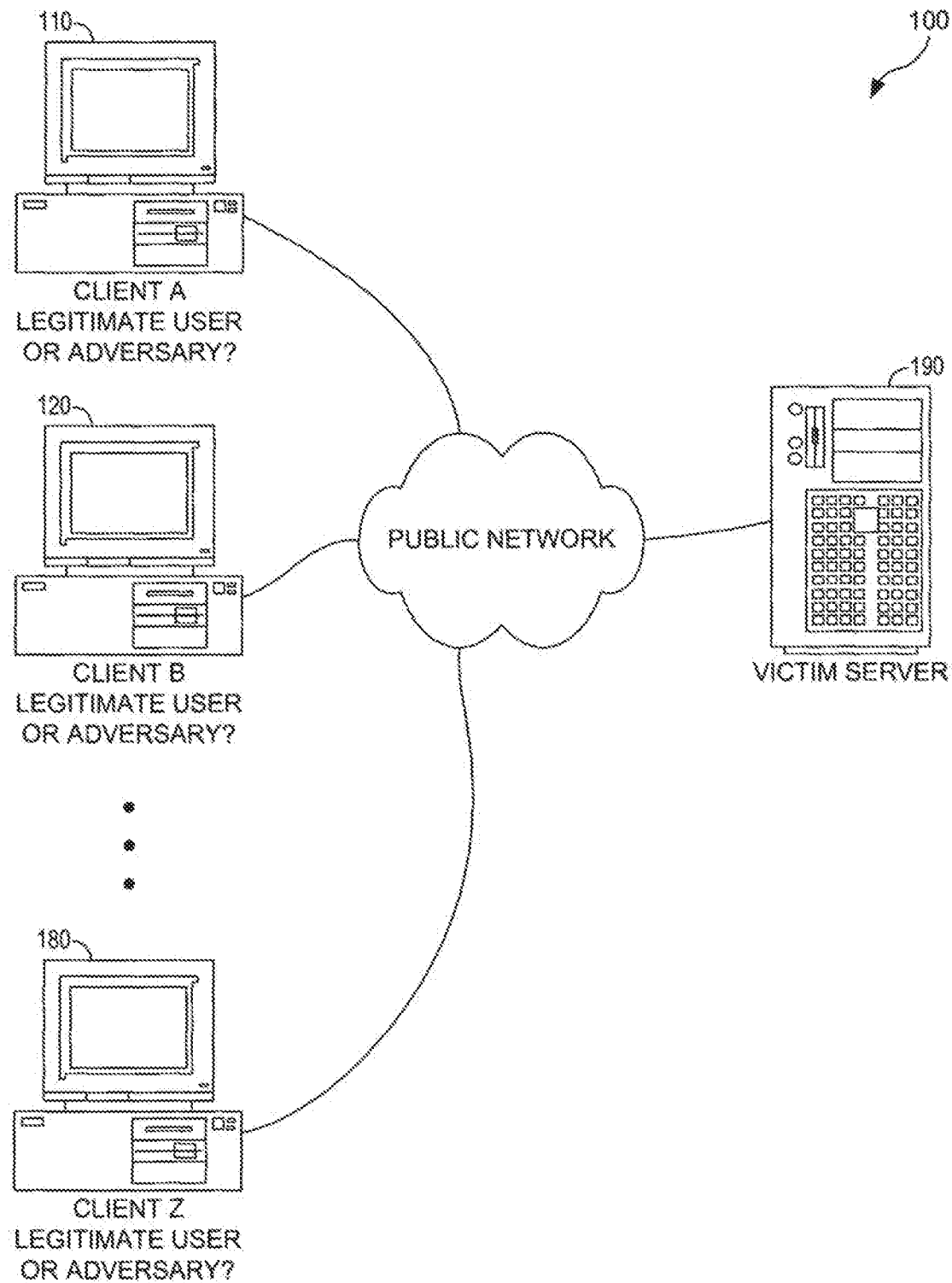
FIG. 1 schematically depicts a client server system in which denial of service attacks can occur.

Turning to FIG. 1, illustrated is a client-server model 100 in which many clients 110, 120 . . . 180 can request services from a coupled server 190. The clients 110-180 could be a legitimate client which sends legitimate requests for service to the server 190, or it could be an adversary client which sends bogus requests to the server to create a DOS attack. The server 190 might not be able to differentiate between a legitimate request and bogus requests since a bogus request can have the correct format as a legitimate request.

In the system 100, a generic front-end protocol is defined between the client 110-180 and server 190 to protect the computing and storage resources on the server 190 from being depleted by adversary clients that send bogus requests for service to the server. This is a generic solution and can be used as a front-end to any session protocols used between a client 110-180 and server 190 in which the client requests some type of a service from the server 190.

The system 100 does not require substantial changes to the existing protocols used between the client 110-180 and server 190. Generally, the system 100 adds a protection layer, that is, the front-end protocol, beneath the current or any future protocols. One use of the front-end protocol is to protect the server 190 against: DOS attacks by making the server obtain some level of assurance from the client 110-180 that the client is a legitimate client before the server 190 honors its request for service, and getting engaged in a subsequent session protocol with the client. Moreover, the front-end protocol helps ensure that the computing and storage resources on the server 190 will not be depleted and legitimate clients 110-180 can still receive services from the server 190 in the face of DOS attacks.

Turning now to FIG. 2, illustrated is an example of a problem-solution table with K entries that is maintained by the server 190. The "a mod b" operation in FIG. 2 denotes the modulo operation that produces the remainder of a divided by b. This example problem-solution table is intended to illustrate one embodiment of designing such a table using the exponentiation and modulo operations. Many other operations can be used and the computational intensity for the problem can vary as well.

Typically, the front-end protocol works as follows. Before the client 110-180 can request a service from the server 190 and establish a session, the client 110-180 first sends a "RequestMessage". The RequestMessage contains the ChentId, that is, the client identifier. The Client& can be any unique ID, such as the IP (Internet Protocol) address. It is not required that the server 190 knows the ChentId ahead of time before receiving the RequestMessage from the client 110-180.

In reply to the RequestMessage, the server then sends a ChallengeMessage back to the client. The ChallengeMessage contains the ChentId, a sequence number, that is, the SeqNo. The sequence number correlates to the ChallengeMessage with the ResponseMessage, as will be described later within this document. It is not the same as the index number. Furthermore, a Problem is sent from the server problem-solution table. Generally, the time for the client 110-180 to calculate the answer is a non-trivial time frame, thereby reducing the number of mass DoS attacks an adversarial client can make in a given time period.

The server 190 also maintains a SessionCount parameter. The SessionCount indicates the number of active, on-going sessions with clients 110-180 that the server 190 is supporting at any given time. Initially, when the server 190 boots up, it sets SessionCount to zero. Each time a session is established with a client 110-180, the server 190 adds one to SessionCount. Each time a session with a client 110-180 is terminated, the server 190 subtracts one from the SessionCount. A threshold value "S" specifies the maximum number of concurrent sessions that the server 190 is able to support with clients 110-180. The value of S depends on the computing power and storage capacity on the server 190. Thus, at any given time $$0 \leq SessionCount \leq S$$

The server 190 also maintains a RequestCount parameter. The server 190 initially sets RequestCount to zero. Each time the server 190 sends a ChallengeMessage to a client 110-189, it adds one to RequestCount. Only when RequestCount<S, can the sever 190 send ChallengeMessages to clients. When RequestCount=S, if the server 190 receives a RequestMessage from a client 110-180, the server 190 discards the RequestMessage and does not send a ChallengeMessage back to the client 110-180.

Each time a session with a client is terminated, the server 190 not only subtracts one from SessionCount but it also subtracts one from RequestCount. If RequestCount=S for some time greater than a threshold time T, then the sever 190 sets RequestCount=SessionCount if SessionCount<S. This ensures that the server 190 will eventually honor requests for service from clients 110-180 even in the face of DoS attacks or when ChallengeMessages or ResponseMessages are not received correctly (for example due to messages being lost in transmission). Typically, the RequestCount is always greater than or equal to SessionCount since some client 110-180 requests for establishing sessions with the server 190 might not actually lead to active session establishments.

Turning now to FIG. 3, illustrated are some typical front-end protocol exchanges. The ChallengeMessage sent from the server 190 to a client 110-180 in flow (2) includes a SeqNo. The SeqNo is used to keep track of the ChallengeMessage, and to associate it with the corresponding ResponseMessage expected from the client 110-180. The ResponseMessage from the client 110-180 also contains the SeqNo sent with the ChallengeMessage.

Typically, the server 190 maintains a circular sequence number space 0 through N−1, where N≥S and N≥K. That is, the sequence numbers are:

..., 0, 1, 2, ..., N−2, N−1, 0, 1, 2, ..., N−2, N−1, 0, 1, 2, ...

The server 190 assigns the SeqNo for a ChallengeMessage from its sequence number space. Initially, when the server 190 boots up, it assigns 0 to SeqNo for the first ChallengeMessage it sends, 1 to SeqNo for the second ChallengeMessage it sends, 2 to SeqNo for the third ChallengeMessage it sends, and so forth.

Turning now to FIG. 4, illustrated is a "window" maintained by the server 190 over its sequence number space. The window contains the SeqNos of ChallengeMessages sent by the server. The window further indicates the SeqNos that the server 190 expects to see in ResponseMessages from clients 110-180.

Typically, the size of the window of FIG. 4 is always less than or equal to S. Initially, when the server 190 boots up and assigns 0 to SeqNo for the first ChallengeMessage, the server 190 sets the trailing edge and the leading edge of the window to 0. From then on, each time the server 190 wants to send a ChallengeMessage, it first advances the leading edge of the window by one and then assigns the leading edge number to the SeqNo for the ChallengeMessage.

When the server 190 receives a ResponseMessage with a SeqNo that falls within the window of FIG. 4, the server 190 performs as follows. If the SeqNo is not the same as the window's trailing edge number, the server 190 marks the SeqNo within the window as a ResponseMessage that is received out-of-sequence. Referring to FIG. 4, if the received SeqNo is 9, then the server 190 marks 9 within the window. Otherwise, if the SeqNo is the same as the window's trailing edge number, then the server 190 shrinks the window from the trailing edge by one.

Referring to FIG. 4, however if the received SeqNo is 6, then the server 190 changes the window's trailing edge from 6 to 7. Additionally, when the window's trailing edge becomes a marked number, the server 190 shrinks the trailing edge to the next unmarked number within the window if at least one such unmarked number within the window exists. In FIG. 4, if the window's trailing edge becomes 8 (which is a marked number), the server 190 shrinks the trailing edge to 9.

When the server receives a ResponseMessage with a SeqNo that falls outside the window, or otherwise corresponds to a marked number within the window, the server 190 simply discards the ResponseMessage with no further action. This helps to protect against replay attacks or bogus ResponseMessages from adversary clients 110-180.

The ResponseMessage from a client 110-180 to the server 190 contains the ClientId, SeqNo and Solution. The ResponseMessage must contain the correct Solution, that is, answer, to the Problem sent in the ChallengeMessage. If the received SeqNo falls within the server window and corresponds to an unmarked number, the server 190 then agrees to engage in a subsequent session protocol with the client 110-180 if the received Solution is correct. Otherwise, the server 190 ignores the client's 110-180 request and takes no further action.

When the server 190 decides to send a ChallengeMessage back to the client 110-180, the server 190 needs to assign a Problem from the problem-solution to the ChallengeMessage. The assignment can be done in many ways. One way is to compute the mod of the assigned SeqNo over K, that is, the number of entries in the problem-solution table, and use that as the Index for the problem for the ChallengeMessage. That is, Index=SeqNo mod K The server 190 need not advertise K to the public and could periodically update the problem-solution table by changing the problems. When the server 190 receives a ResponseMessage from a client 110-180, the server 190 can quickly verify the correctness of the Solution contained in the ResponseMessage. The server 190 simply computes the Index using the SeqNo contained in the ResponseMessage, as shown above and looks up the Solution in the problem-solution table, such as illustrated in FIG. 2. If the Solution contained in the ResponseMessage is the same as the one in the table then the received Solution is correct.

A client 110-180 might not receive a ChallengeMessage back from the server 190 in reply to its RequestMessage, or alternatively the ResponseMessage might not make it to the server 190. This could happen if the server 190 has already reached its maximum capacity, as described above, or it could be due to message/packet loss in transmission. Thus, if the client's 110-180 initial request does not lead to a successful session establishment with the server 190, the client 110-180 should retry sending periodic requests several times before giving up.

Generally, the system 100 is directed to a generic front-end solution for protecting against DOS attacks. The system 100 is typically light weight and does not require changes to existing protocols, and does not require the use of cryptographic techniques. Moreover, it does not require the server 190 to perform computationally intensive operations and maintain state information about individual requests from clients. The server 190 leaves the burden on the client to prove its legitimacy (through the disclosed front-end protocol) before agreeing to engage in session establishment.

Figure 5:
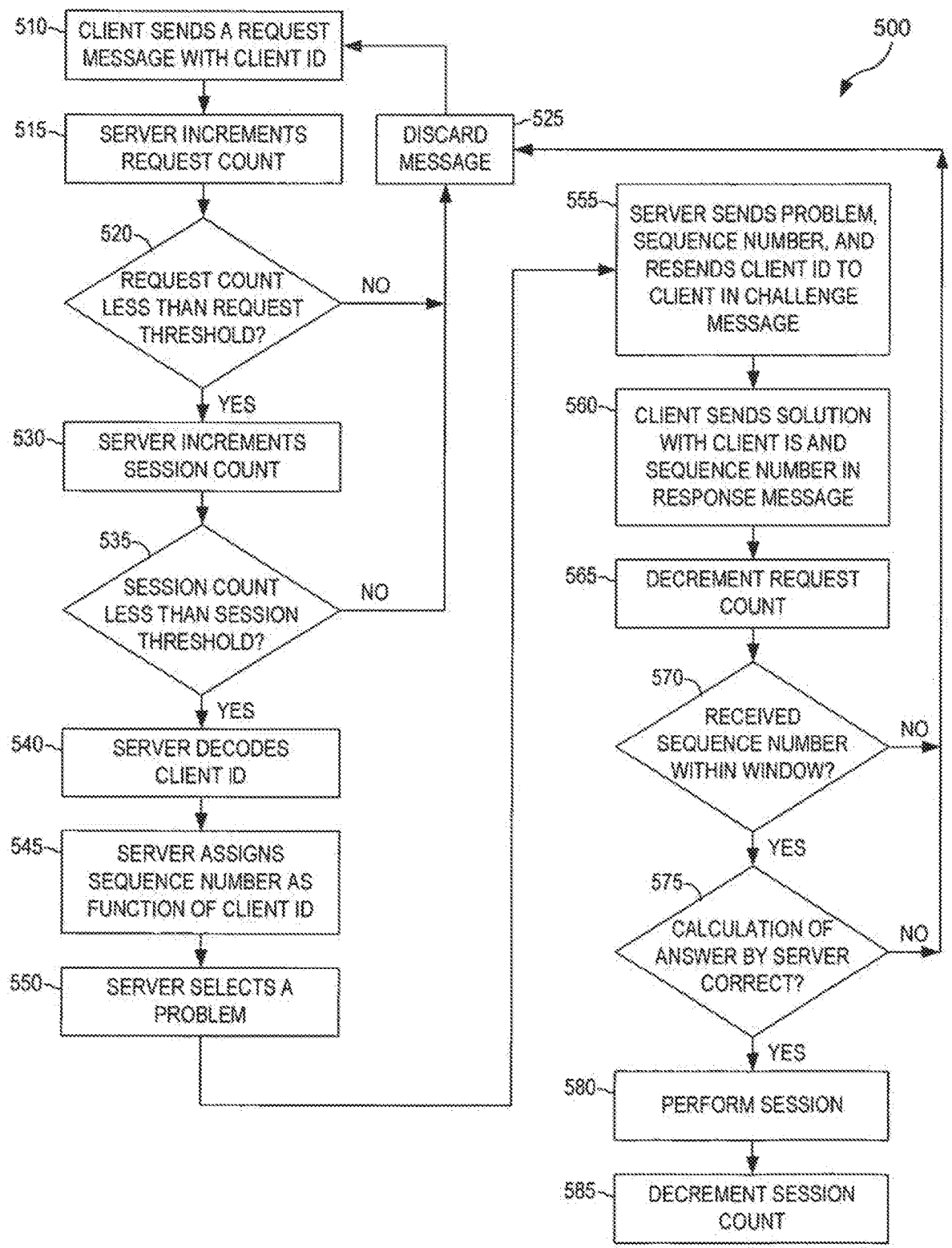
FIG. 5 illustrates a method for protecting against denial of service attacks.

Turning now to FIG. 5, illustrated is a method 500 for practicing the system 100. In step 510, a client sends a RequestMessage with a client ID. In step 515, the server 190 receives the request, and increments the request count. In step 520, it is determined if the requestcount less than allowable request threshold. If yes, in step 530, the server 190 increments the session count. If no, then in step 525, the message is discarded.

After step 520, in step 535, it is determined if the session count is less than the session threshold. If it is not, than the message is discarded in step 525. If it is less, then in step 540, the server decodes the client ID. In step 545, the server 190 assigns a sequence number (SEQ NO) as a function of the received client ID. In step 550, the server selects a problem. In step 555, the server 190 sends the problem, the sequence number and resends the client ID to client in a challenge message ChallengeMessage. In step 560, the client sends the solution with client ID, sequence number in a ResponseMessage.

In step 565, requestcount is decremented. In step 570, it is determined whether the received sequence number from the client in the ResponseMessage is within the accepted reply window. If it is not within the accepted reply window, then the message is discarded in step 525. If it is within the accepted reply window, then in step 575, it is determined whether the client sent the correct solution. If it did not send the correct solution, then the message is discarded in step 525. If it did send the correct solution, then the session is performed in step 580. Finally, the session count is decremented in step 585.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

What is claimed is:

1. A method for protecting a server against denial of service attacks, comprising:
    maintaining, by a server having a processing device for verifying legitimate requests for service, a session count and a session threshold, the session count indicating a quantity of active client sessions the server is maintaining and the session threshold specifying a maximum quantity of concurrent client sessions the server can maintain;
    responsive to receiving a request from a client, verifying that a request count maintained by the server is less than a request threshold;
    responsive to verifying that the session count is less than the session threshold, sending a challenge message to the client;
    receiving a response message to the challenge message from the client;
    responsive to receiving the response message from the client that includes a solution and a sequence number, decrementing the request count;
    determining whether the received sequence number is within a window and a calculation of answer by a server is correct, performing the session; and
    responsive to terminating the session with the client, decrementing the session count and the request count.

2. The method of claim 1, further comprising, discarding the request in response to determining that the request count meets the request threshold.

3. The method of claim 1, further comprising, prior to sending the challenge message, verifying that the session count is less than the session threshold.

4. The method of claim 1, further comprising:
    determining an Internet Protocol (IP) address of the client from the request; and
    including the IP address with the challenge message.

5. The method of claim 1, further comprising:
    in response to determining that the session count is less than the session threshold, assigning a sequence number associated with the request message; and
    computing an index based on the assigned sequence number.

6. The method of claim 1, further comprising:
in response to determining that the request count is less than the session count, sending a challenge message to the client.

7. The method of claim 6, further comprising:
in response to a session with the client being terminated, subtracting a value of one from the session count and subtracting an equal value from the request count.

8. The method of claim 6, further comprising:
in response to sending the challenge message to the client, incrementing the request count by one.

9. The method of claim 7, further comprising:
in response to determining that the request count equals a threshold value for a maximum number of concurrent sessions that can be supported by the server for a threshold period of time, setting the request count equal to the session count if the session count is less than the maximum number of concurrent sessions that can be supported by the server.

* * * * *